(12) United States Patent
Joubert et al.

(10) Patent No.: US 11,409,517 B2
(45) Date of Patent: Aug. 9, 2022

(54) INTELLIGENT PREFETCHING FOR OS COMPONENTS

(71) Applicant: Microsoft Technology Licensing, LLC, Redmond, WA (US)

(72) Inventors: Philippe Joubert, Kirkland, WA (US); Yagyaansh Goenka, Seattle, WA (US); Sencer Nuri Yeralan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/895,811

(22) Filed: Jun. 8, 2020

(65) Prior Publication Data

US 2021/0382710 A1   Dec. 9, 2021

(51) Int. Cl.
*G06F 8/71* (2018.01)
*G06N 20/00* (2019.01)

(52) U.S. Cl.
CPC .............. *G06F 8/71* (2013.01); *G06N 20/00* (2019.01)

(58) Field of Classification Search
USPC .......................................................... 717/121
See application file for complete search history.

(56) References Cited

U.S. PATENT DOCUMENTS

| | | | | |
|---|---|---|---|---|
| 7,996,814 B1 * | 8/2011 | Qureshi | ................ | G06F 11/079 717/120 |
| 8,001,527 B1 * | 8/2011 | Qureshi | ................ | G06N 5/048 717/120 |
| 8,327,329 B2 | 12/2012 | Vierzba et al. | | |
| 8,578,364 B2 | 11/2013 | Schreier et al. | | |
| 9,690,553 B1 * | 6/2017 | Brodie | ................ | G06F 8/433 |
| 9,760,417 B2 | 9/2017 | Gallardo et al. | | |
| 10,394,580 B2 | 8/2019 | Hall et al. | | |
| 2013/0031490 A1 | 1/2013 | Joo et al. | | |
| 2014/0180738 A1 | 6/2014 | Phillipps et al. | | |
| 2015/0286479 A1 * | 10/2015 | Oberheide | .......... | G06F 9/44505 717/122 |

(Continued)

OTHER PUBLICATIONS

"Android version history", Retrieved from: https://en.wikipedia.org/wiki/Android_version_history, Retrieved Date: Mar. 16, 2020, 48 Pages.

(Continued)

*Primary Examiner* — John Q Chavis

(57) ABSTRACT

The correct clusters of operating system (OS) components to package for hydration to client devices is learned through analyzing telemetry data of numerous end devices. The telemetry data captures snapshots of the OS components that were used or loaded by the end devices during runs of different applications. An OS component service mines this telemetry data and compares the frequency in which pairs of OS components are used by the end devices together during the different applications runs. Using on these frequencies, the OS components are filtered in a relationship graph and an clustering algorithm is applied to determine whether the OS components are interdependent (meaning used together) or independent (meaning not used together). Interdependent OS components are packaged together into a hydration package and may be transmitted to client computing devices requesting any of their constituent OS components.

20 Claims, 7 Drawing Sheets

(56) References Cited

U.S. PATENT DOCUMENTS

| | | | |
|---|---|---|---|
| 2017/0364377 A1 | 12/2017 | Koller Jemio et al. | |
| 2019/0042129 A1* | 2/2019 | Tarango | G06F 3/067 |
| 2019/0361697 A1* | 11/2019 | Hu | G06F 11/3051 |
| 2020/0089574 A1* | 3/2020 | Miah | G06F 16/285 |
| 2020/0174464 A1* | 6/2020 | Cella | G05B 19/4183 |

OTHER PUBLICATIONS

"Data rehydration", Retrieved from: https://web.archive.org/web/20190503130925/https://cloud.google.com/transfer-appliance/docs/2.0/data-rehydration, May 3, 2019, 2 Pages.

Holdsworth, Katharine, "Windows Schedule", Retrieved from: https://osgwiki.com/wiki/Windows_Schedule, Retrieved Date: Mar. 16, 2020, 9 Pages.

Huculak, Mauro, "How to manage Windows 10's many 'optional features'", Retrieved from: https://www.windowscentral.com/how-manage-optional-features-windows-10, Feb. 1, 2017, 21 Pages.

"International Search Report & Written Opinion Issued in PCT Application No. PCT/US21/025843", dated Jul. 6, 2021, 12 Pages.

Qu, et al., "A Framework for Dynamic Analysis Dependency in Component-Based System", In Proceedings of the 2nd International Conference on Computer Engineering and Technology, vol. 4, Apr. 16, 2010, 5 Pages.

* cited by examiner

| OS Component | A | B | C | D | E | F | G |
|---|---|---|---|---|---|---|---|
| A | 100% | 100% | 100% | 0% | 50% | 50% | 50% |
| B | 100% | 100% | 100% | 50% | 50% | 50% | 50% |
| C | 100% | 100% | 100% | 50% | 50% | 50% | 50% |
| D | 100% | 100% | 100% | 100% | 0% | 15% | 0% |
| E | 100% | 100% | 100% | 0% | 100% | 30% | 21% |
| F | 100% | 100% | 100% | 100% | 0% | 100% | 45% |
| G | 100% | 100% | 100% | 0% | 100% | 55% | 100% |

INTELLIGENT PREFETCHING FOR OS COMPONENTS

BACKGROUND

Conventional operating systems (OSes) are designed for widespread use by numerous groups of users in different user scenarios. OS engineers have extended OS capabilities by allowing users to download and install additional OS components needed for specific applications that are not available by default. But as the consumer space gets more diverse, it is impractical and inefficient to define a custom OS composition for each scenario. This led to designing OSes to adapt over time to what different user needs by hydrating needed OS components to the local device on demand when applications need them. But applications today do not know all of the dependencies of OS components, and therefore only request specific OS components identified by the application as missing, without requesting other OS components that are also needed but not initially identified by the application. Consequently, OS components are often downloaded in a sequential, piecemeal fashion, with OS component A hydrated first, OS component B hydrated next, and so on as the client computing device discovers the various dependencies of the OS components. This piecemeal on-demand sequencing increases the latency for an application to obtain the correct OS components while also wasting valuable processing, networking, and storage resources for downloading different batches of OS components.

Also, downloadable packages of OS components often do not include the correct components or include many that are not used by some end devices. Unused OS components waste valuable storage and processing resources of the end device, especially because they are loaded into precious active memory. And packages devoid of requisite OS components require the end device to request and download additional components, wasting time as well as processing resources. Similarly, when loading OS components on a client device from permanent storage into active memory (e.g., to run a particular application), conventional OSes load a predetermined package of components that are selected by a developer. For the same reasons mentioned above, these developer-selected packages frequently include OS components that are not used or needed by a running application, which wastes the memory space into which they are moved.

In both situations today—downloading missing OS components and moving OS components to active memory—the dependencies of OS components being hydrated to the client device are not known up front by the requesting applications and are subject to the expertise of developers. Consequently, OS components that are not needed are downloaded or moved to active memory, taking up valuable resources on the client device. Or the requisite OS components may not be included in the OS package, and the client device needs to then subsequently retrieve interdependent OS components in a piecemeal fashion.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Embodiments disclosed herein are directed to machine-learning interdependencies of OS components by analyzing telemetry data of numerous end devices. The telemetry data is analyzed and the different OS components used by the end devices during different runs of applications are analyzed to determine their use relationships with each other (e.g., the frequency with which OS component A is used with OS components B, C, and so forth). These OS components are correlated to each other based on the frequency or number of times they appear together in the telemetry data. The OS components are classified as interdependent (meaning used together) or independent (meaning not used together) using a clustering algorithm and through filtering the telemetry data based on the frequency or number of times the OS components appear together. Interdependent OS components are grouped together into clusters, and the clusters are correlated to each other to create hydration packages that may be hydrated to client computing devices whenever one of the clustered OS components is requested. For example, a request for OS component A may yield a cluster of interdependent OS components B, C, and D, which were not requested. Thus, a client computing device requesting to download one OS component receives a hydration package with additional OS components that operate with the requested OS component, saving valuable time and processing resources from later having to download the other interdependent OS components.

BRIEF DESCRIPTION OF THE DRAWINGS

The disclosed examples are described in detail below with reference to the accompanying drawing figures listed below:

FIG. 4 illustrates a diagram of a graph showing frequencies of OS components appearing in telemetry data relative to each other;

DETAILED DESCRIPTION

Figure 1:
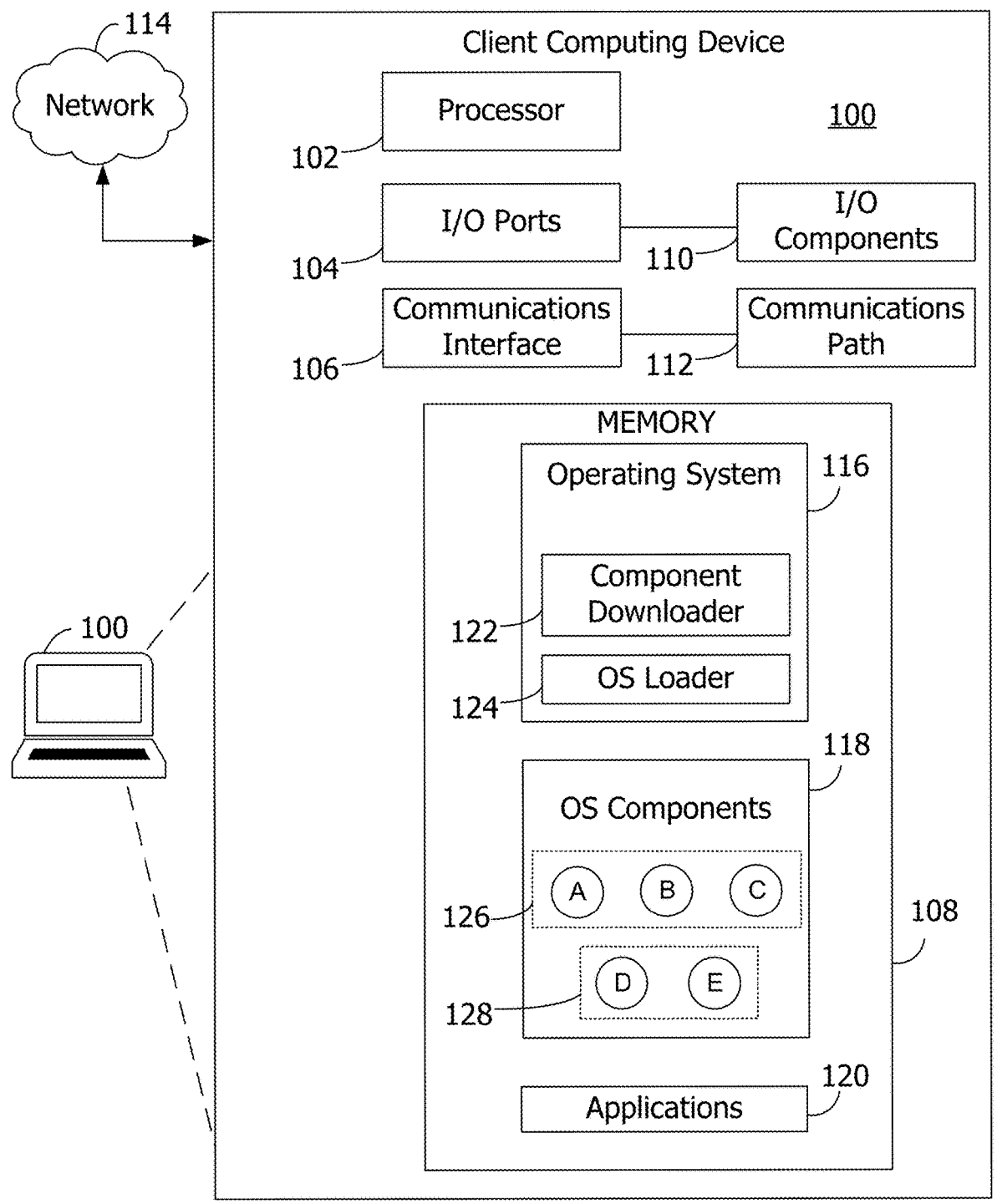
FIG. 1 is a block diagram of an example client computing device 100 for implementing aspects disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The present disclosure is directed to systems, methods, and computer program products for facilitating the dynamic addition and removal of OS components on computing devices based on interdependencies of the OS components identified through machine-learning. The disclosed embodiments and examples intelligently select the correct OS components to hydrate to a client device through learning the relationship interdependencies between the OS components from telemetry of other end devices. In some embodiments, the analyzed telemetry data consists of snapshots of the OS components running, or loaded, during different runs of applications on the end devices. These snapshots of telemetry data may then be analyzed to determine the interdependencies of the OS components relative to each other. For example, OS component A may be loaded 100% of the time with OS component B but only 20% of the time with OS component C during 100 runs of application on different end devices (e.g., smartphones, laptops, wearable devices, etc.). Therefore, OS component A may be deemed to be interdependent with OS component B but independent of OS component C.

Once the interdependencies of the OS components are determined from the telemetry data of the other devices, the OS components are organized into clusters. When a client computing device requests an OS component, the entire cluster that includes the requests OS component and other interdependent OS components are downloaded, or hydrated, to the client computing device.

Conventional OSes expose an application programming interface (API) surface through a series of applications and dynamically loaded libraries (DLLs). A single DLL might expose a series of API calls that may be used by one or more applications executing on a client device. OSes, such as WINDOWS® developed by the MICROSOFT CORPORATION® of Redmond, Wash., MAC OS® from APPLE, INC.® of Cupertino, Calif., and ANDROID™ of GOOGLE, INC.® of Mountain View, Calif., all ship with a well-defined set of OS components and a consistent API surface to ensure application compatibility across platforms. Application developers create software applications that use a subset of the complete OS API surface, and therefore a subset of the OS functionality. This utilized subset maps to a set of functionality within the OS.

In the present context, an "OS component" is a software module that exposes an application programming interface (API) surface that applications can use to interface and access underlying hardware. The sum of the API surface exposed by all OS components constitutes the API surface available to applications, which is sometimes referred to as a software development kit (SDK). OS components can either be loaded in the same address space as the application process or in different processes, in which case they are accessed using remote procedure calls. Examples of OS components include, without limitation, dynamic link libraries (DLLs), binaries, DIRECTX®, WINDOWS® Internet (WinINET), indexer services, text-to-speech converters, and the like.

Features of an OS that support applications are made up of several interdependent OS components. These OS components are modularly designed to support certain functionality and call upon other OS components. OS components are designed to focus on a particular functionality that makes up the feature. For example, OS components may be designed for rendering an image to a screen, managing movement of a player in a game, a tracing the reflection of light in a scenery, etc.

"Telemetry data" refers to snapshots of data collected from computing devices that specify instances of applications being run and the OS components being used or loaded during those application runs. Collectively, an instance of an application being run and its invoked OS components are referred to herein as a "trace" or "stack trace." The disclosed embodiments collect and analyze telemetry data myriad computing devices, such as, for example but without limitation, laptops, mobile tablets, smartphones, gaming consoles, Internet of Things (IoT) devices, augmented-reality (AR) or virtual reality (VR) headsets, and the like.

"Interdependent" and "interdependencies" refer to two OS components determined to be used together based on the telemetry data of end devices. Conversely, "independent" OS components are OS components determined not to be needed together based on the telemetry data of end devices.

An "OS cluster," or "cluster," refers to one or more components for downloading to a client device. Clusters may include any number of OS components (e.g., one, two, five, ten, etc.). In some embodiments, the OS clusters only include OS components that are "two-way interdependent," meaning they are determined to be interdependent in both direction (e.g., from OS component A to B and from OS component B to A). "Direct" two-way interdependency refers to two OS components being determined to be interdependent in both directions (e.g., OS components A to B and B to A). For example, OS components A and B are present with each other 100% of the time in both directions, or at least both are present more than the interdependency threshold. "Indirect" two-way interdependency refers to two OS components (e.g., OS components A and C) that are not directly interdependent in at least one direction, but that are interdependent to an intermediary OS component (e.g., B) that is. For example, OS component A may be present 100% of the time with C while C is only present 20% of the time with C; but B is present 100% of the time with A and C. In this scenario, OS components A and C are determined to be interdependent based on the intermediary relationship with B. Thus, two-way interdependency between OS components for inclusion in an OS cluster may be satisfied either directly between the OS components or indirectly through an intermediary OS component.

A "hydration package" is a set of one or more OS clusters. The disclosed OS clusters are different from the hydration packages in that the clusters are atomic units where all the OS components have a direct or indirect two-way dependency; whereas, a hydration package may include clusters that are correlated to each other by strong directional dependencies. "Two-way interdependency" means that OS components are determined to be interdependent in both ways, e.g., OS component A to B and OS component B to A.

Along these lines, an OS cluster consists of a set of strongly connected components that either directly or indirectly have interdependencies with other OS components classified to the same cluster. A hydration package consists of one or more OS clusters, where one of the OS clusters is the immediate OS cluster containing the OS component requested by the client machine, and the other OS clusters are correlated to the immediate cluster using the techniques described below. Specifically, the correlation between two OS clusters is measured by the directional edges of a relationship graph going from any OS component in a cluster to any other OS component in another cluster.

"Hydration" and "hydrating" refer to the actions of either: (1) downloading OS components from an online resource (e.g., server) to a client device, and/or (2) loading OS components from the local storage of a client computing device to its active memory. Conversely, "dehydration" and "dehydrating" refer to the actions of removing OS components from storage or active memory of the client computing device. Also, "local" files and OS components are stored in memory of a client computing device, as opposed to on a remote resource like a server.

The disclosed embodiments hydrate interdependent OS components to client computing devices in a single downloaded package, instead of sequentially. For example, an OS cluster comprising interdependent OS components A, B, and C may be hydrated to a client device that requests just OS component A. Conventional hydration systems required the client device to download OS component A, discover that OS component B was needed, then download OS component B, discover OS component C was needed, then download OS component C, and so on. This sequential, piecemeal hydration increased the total time needed to download all of the requisite and interdependent OS components. Whereas, the disclosed embodiments machine-learn the interdependencies of OS components up front—from the telemetry data of other end devices—and package all interdependent OS components together for hydration at the same time. This saves considerable time, getting the necessary OS components to the client computing device faster, and frees up processing resources needed to hydrated OS components over longer periods.

Having provided an overview of some of the disclosed examples and clarified some terminology, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram of an example client computing device 100 for implementing aspects disclosed herein. Client computing device 100 includes one or more processors 104, input/output (I/O) ports 104, a communication interface 106, computer-storage memory (memory) 108, I/O components 110, and a communications path 112. The client computing device 100 is able to communicate over a network 114 with other online devices. The client computing device 100 is but one example of a suitable computing environment and is not intended to suggest any limitation as to the scope of use or functionality of the invention. While the client computer device 100 is depicted as a seemingly single device, multiple client computing devices 100 may work together and share the depicted device resources. For instance, various processors 102 and memory 108 may be housed and distributed across multiple client computing devices 100.

The processor 102 includes any number of microprocessors, microcontrollers, analog circuitry, or the like for that are programmed to execute computer-executable instructions for implementing aspects of this disclosure. In some examples, the processor 106 is programmed to execute instructions such as those illustrated in the other drawings discussed herein.

The I/O ports 104 connect various I/O components 110 to the client computing device 100. Examples I/O components 120 include, for example but without limitation, speakers, displays, touch screens, augmented- and virtual-reality (AR and VR) headsets, peripheral devices, microphones, joysticks, scanner, printers, etc. Such components are well known to those in the art and need not be discussed at length herein.

The communications interface 106 allows software and data to be transferred between the client computer device 100 and external devices over the network 114. Examples of communications interface 106 may include a modem, a network interface (such as an Ethernet card), a communications port, a Personal Computer Memory Card International Association (PCMCIA) slot and card, etc. Software and data transferred via the communications interface 106 are in the form of signals that may be electronic, electromagnetic, optical or other signals capable of being received by communications interface 106. Such signals are provided to the communications interface 106 via a communications path (e.g., channel) 112. This communications path 112 carries the signals and may be implemented using a wired, wireless, fiber optic, telephone, cellular, radio frequency (RF), or other communications channel.

The network 114 may include any computer network or combination thereof. Examples of computer networks configurable to operate as network 306 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 114 is not limited, however, to connections coupling separate computer units. Rather, the network 114 may also comprise subsystems that transfer data between servers or computing devices. For example, the network 114 may also include a point-to-point connection, the Internet, an Ethernet, an electrical bus, a neural network, or other internal system. Such networking architectures are well known and need not be discussed at depth herein.

The computer-storage memory 108 includes any quantity of memory devices associated with or accessible by the client computing device 100. The computer-storage memory 108 may take the form of the computer-storage media references below and operatively provide storage of computer-readable instructions, data structures, program modules and other data for the client computing device 100 to store and access instructions configured to carry out the various operations disclosed herein. The computer-storage memory 108 may include memory device in the form of volatile and/or nonvolatile memory, removable or non-removable memory, data disks in virtual environments, or a combination thereof. And computer-storage memory 108 may include any quantity of memory associated with or accessible by the client computing device 100. Examples of client computing device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory.

The computer-storage memory 108 may be internal to the client computing device 100 (as shown in FIG. 1), external to the client computing device 100 (not shown), or both (not shown). Additionally or alternatively, the computer-storage memory 108 may be distributed across multiple client computing devices 100 and/or servers, e.g., in a virtualized environment providing distributed processing. For the purposes of this disclosure, "computer storage media," "computer-storage memory," "memory," and "memory devices" are synonymous terms for the computer-storage media 108, and none of these terms include carrier waves or propagating signaling.

In some examples, the computer-storage memory 108 stores executable computer instructions for an operating system (OS) 116, various OS components 118 (including those hydrated according to the techniques disclosed herein), and various software applications 120. The OS 116 may any OS designed to the control the functionality of the client computing device 100, including, for example but without limitation: WINDOWS® developed by the MICROSOFT CORPORATION® of Redmond, Wash., MAC OS® developed by APPLE, INC.® of Cupertino, Calif., ANDROID™ developed by GOOGLE, INC.® of Mountain View, Calif., open-source LINUX®, and the like.

The computer-storage memory 108 includes primary (or "active") memory and secondary memory. One skilled in the art will understand that active memory is the direct access storage for the processor 102 and is where different applications 120 and OS components 118 are stored. The persistent memory is "persistent" storage (e.g., non-volatile) where low-level OS routines that are responsible for memory function, such as scheduling of disk operations, head movement, error handling, etc., are stored. Among other functionality, the persistent storage includes a Basic Input/Output System (BIOS) used to move the correct applications into primary memory at startup. Though different OSes store different routines and functionality in primary and secondary memory, this disclosure references embodiments using the active memory for running the applications 120 and requisite OS components 118, and using the persistent memory for permanently storing the applications 120 and OS components 118 while not being run. Some specific embodiments discussed below refer to the applications 120 and OS components 118 being loaded into the active memory for execution.

The OS 116 includes an OS component downloader 122 and an OS loader 124, among other things. The OS component downloader 122 retrieves—over the network 114—requisite OS components 118 that are necessary for the applications 120 from online sources. The OS loader 124 loads different OS components 118 into the active memory of the computer-storage memory 108 for the applications 120 to use when running. For example, a fitness application that uses BLUETOOTH®-enabled peripherals may need OS components 118 for BLUETOOTH® synchronization, among other things. A specific DLL of a BLUETOOTH® synchronization OS component 118 may be moved into active memory (as discussed below) when the fitness application is opened.

In operation, the client computing device 100 executes the applications 120, which use specific OS components 118. For example, a word-processing application may have a dictation feature that translates text into a specific language. The end language (e.g., Mandarin, English, etc.), and perhaps specific fonts (e.g., Cyrillic) of the language, may be packaged as OS components 118 that must be locally stored on the client computing device 100 for the dictation feature to work properly. If the end language and fonts are not locally stored, the component downloader 122 must request these necessary OS components 118 for the dictation feature to work properly.

Traditionally, OS components 118 are not packaged based on their relative interdependencies with each other. Instead, they are packaged based on a developer assembling a downloadable package. This requires the developer to know and stay current with the interdependencies. As discussed in more detail below, the disclosed embodiments learn the correct OS components 118 to provide the components downloader 122 based on the independencies of OS components 118 learned from telemetry data myriad other computing devices. In this way, the disclosed embodiments machine-learn the correct OS components 118 to provide the client computing device 100.

In the depicted embodiment, three OS components 118 (A, B, and C) are hydrated to the client computing device 100 in cluster 126, and two OS components 118 (D and E) are hydrated to the client computing device 100 in cluster 128. These different clusters 126 and 128 represent groups of interdependent OS components 118 that were hydrated to the client computing device 100 at the same time—or in the same downloadable package. In other words, the five shown OS components (A-E) were hydrated to the client computing device 100 hydrated in two different downloaded clusters 126, 128.

Figure 2:
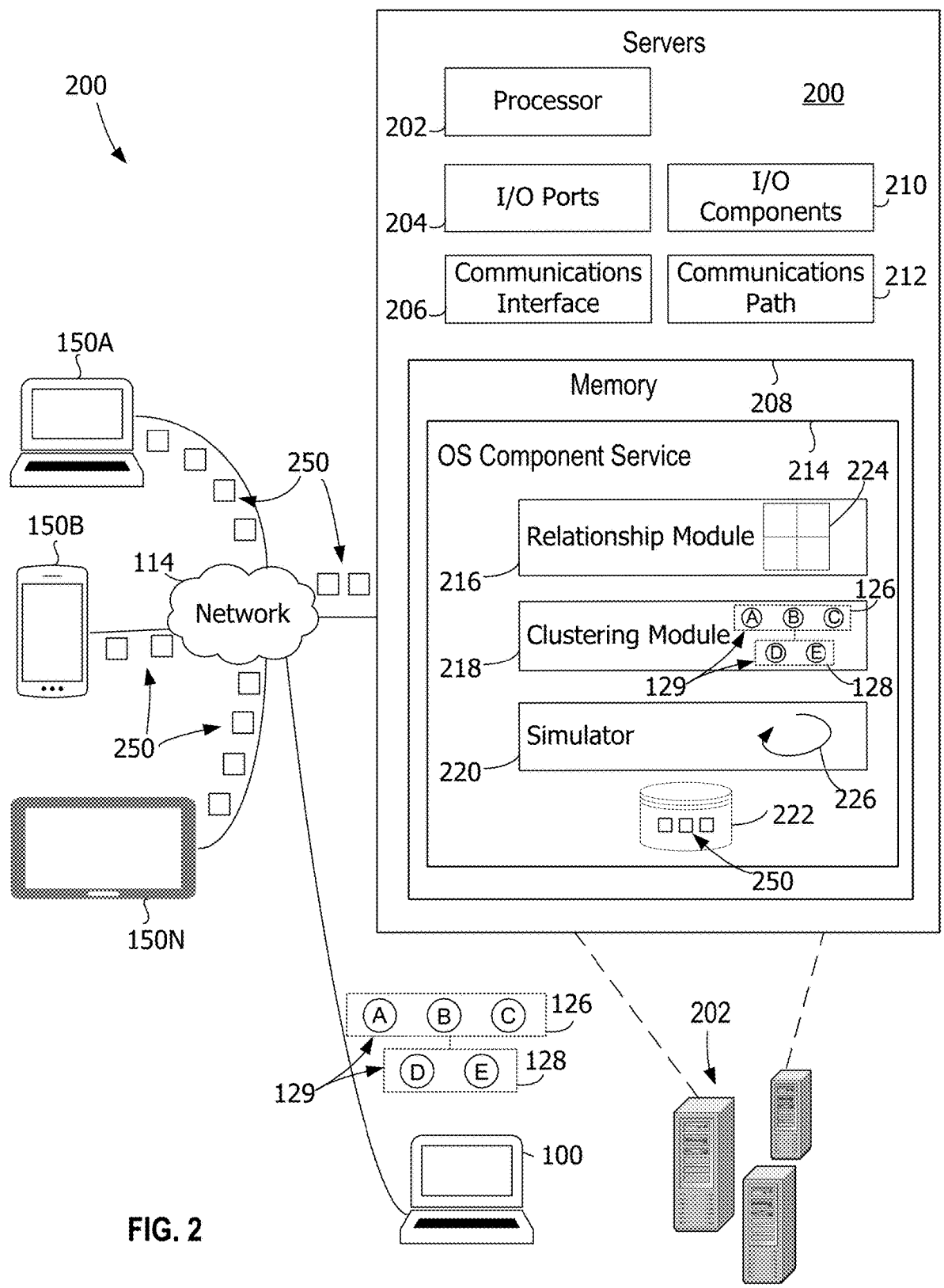
FIG. 2 is a block diagram of a networking environment 200 for providing an OS component service that learns the interdependencies of OS components from numerous end devices.

FIG. 2 illustrates a block diagram of a networking environment 200 for learning the interdependencies of OS components 118 from analyzing numerous other client computing devices, which are shown as end devices 150A-N. The networking environment 200 involves the client computing device 100 shown in FIG. 1, one or more servers 202, and the end devices 150A-N, all of which are able to communicate over the network 114. End devices 150A-N represent any number of computing devices 100, such as laptops (150A), smartphones (150B), tablets (150C), and the like. Any type of computing device capable of communicating over the network 114 may be used as an end device from which to mine telemetry data 250 in order to the learn the interdependencies of OS components 118. For example, network-enabled cars, robots; AR or VR headsets; wearables (e.g., watches, glasses, etc.); personal computers; IoT devices; or the like may all provide the disclosed telemetry data that is used to learn interdependencies of the OS components 118.

Additionally, the networking environment 200 includes one client computing device (labeled as 100 in FIG. 1) that requests and receives OS components 118 as clusters 126 and 128. For purposes of this example, the client computing device 100 requested one of the OS components 118 (e.g., component A), and the servers 200 responded with two clusters 126, 128 of OS components 118, including components A-E. The two clusters 126, 128 as shown as connected to each other to signify that they are included one package download. Put another way, all of components A-E in the clusters 126, 128 are hydrated to the client computing device 100, even though the client computing device 100 only requested a single component (component A). The rest of the OS components 118 (components B-E) are hydrated to the client computing device 100 with the requested OS component (component A) due to the interdependencies learned using the techniques discussed below.

The end devices 150A-N provide telemetry data 250 to the servers 200. The telemetry data 250 comprises snapshots of the OS components 118 running, or at least loaded, for various applications. For example, one of the snapshots for a given application may list different DLLs that are used for the The servers 200 may be any type of server or remote computing device, either as a dedicated, relational, virtual, private, public, hybrid, or other cloud-based resource. The servers include or have access to a processor 202, I/O ports 204, a communications interface 206, computer-storage memory 208, I/O components 210, and a communications path 212 similar to the same-labeled components in FIG. 1. Server topologies and processing resources are generally well known to those in the art, and need not be discussed at length herein, other than to say that any server configuration may be used to execute the OS component server discussed below.

The servers 200 host (store and execute) an OS component service 214 that is configured to analyze the telemetry data 250 of the end devices 150A-N, machine-learn the interdependencies of the OS components specified in the telemetry data 250, and build clusters of the OS components 118 for hydration to requesting client computing devices 100. To do this, the OS component service 214 includes a relationship module 216, a clustering module 218, and a simulator 220. Before discussing these three, some more clarity is provided about the snapshots of the telemetry data 250.

Figure 3:
FIG. 3 illustrates a pictorial diagram of snapshots of telemetry data from end devices.

As mentioned above, each of the end devices 150A-N transmits telemetry data 250 comprising snapshots of the OS components 118 that are being run, or at least are loaded, by executing applications on the end devices 150A-N. Examples of such are shown in FIG. 3, labeled as snapshots 302, 304, 306, and 308. Snapshot 302 captured OS components A, B, and C being loaded during a first run (Run 1) of an application (App 1). Snapshot 304 captured OS components A, B, D, and F being loaded during Run 2 of App 1. Snapshot 306 captured OS components A, B, C, and E being loaded during Run 1 of a second application (App 2). Snapshot 308 captured OS components A, B, C, E, and G being loaded during Run 1 of a second application (App 2). Thus, the snapshots 302-308 indicate which OS components 118 are present during different runs of the applications 120, creating data sets that may be analyzed to machine-learn the interdependencies of the OS components 118. The different snapshots 302-308 may be stored on the servers 200, as depicted by server storage 222, or in remote cloud storage that is accessible by the servers 200.

In some embodiments, the snapshots 302-308 of the end devices 150A-N are captured at a predetermined sample rate. For example, the end devices 150A-N may capture snapshots 302-308 at preset time intervals (e.g., in milliseconds, seconds, minutes, hours, etc.). Alternatively, the snapshots 302-308 may be captured upon the opening or closing of an application 120. Such sample rates and triggering conditions may be set by a developer or machine-learned from the data sets.

The relationship module 216 of the OS component service 214 analyzes the telemetry data 250 snapshots of the end devices 150A-N and builds an associative mapping (referred to herein as "relationship graph" and shown at 224) between the OS components 118 that captures the degree to which each OS component 118 is related to other OS components 118. An example of the relationship graph 224 is shown in FIG. 4, where OS components A-G represent all of the OS components 118 in the telemetry data 250 from all of the end devices 150A-N. In this vein, the relationship module 216 determines the number or frequency (e.g., percentage) of times each OS component A-G appeared in the telemetry data 250 (e.g., in a snapshot) with every other OS component A-G. For example, as shown in FIG. 4, OS components A-C appeared 100% of the time with the rest of the OS components. But OS component D appeared 20% of the time with OS component A, 50% of the time with OS components B and C, 100% of the time with OS components D and F, 0% of the time with OS components E and G.

Instead of percentages between the OS components A-G, some embodiments use count values, meaning the total number of times the OS components A-G were found together in the telemetry data 250. For example, the if OS component A was found in a snapshot with OS component B, count values for both OS components A and B are incremented.

The relationship module 216 builds the relationship graph 224 to reflect these percentages or number of times the OS components A-G were found together in the telemetry data 250. The percentages or count values between OS components A-G are referred to herein as the "relationship data." Also, it should be noted that "frequency" and "percentage" are used interchangeably herein to indicate the number of times over a collection of snapshots that an OS component 118 was found with another OS component. For the sake of clarity, embodiments are discussed using percentages between the OS components A-G, but counts (instead of percentages) may equally be used. The relationship graph 224 indicates the coupling between one OS component 118's usage and another OS component 118's usage. The individual percentages or counts of the relationship graph 224 magnitudes of the relationships between the OS components 118, indicating the likelihood the OS components 118 are used in conjunction with each other.

It should be noted, however, that the magnitudes of the association between the OS components 118 are not always symmetric. Rather, they are directional, meaning that the percentages are indicative of the frequency of times one OS component 118 is found with another OS component, but not vice versa. A first OS component 118 may have a different percentage with a second OS component 118 than the second OS component 118 has with the first OS component 118. As shown in FIG. 4, OS component G was found 21% of the time when OS component E was present in the snapshots; yet, OS component E was found 100% of the time when OS component G was present in the snapshots. Thus, the percentages from E to G (21%) are different than from G to E (100%).

The clustering module 218 determines which OS components A-G are interdependent and which are independent using the percentages of the relationship graph 224. To do so, the clustering module 216 first prunes the data in the relationship graph 224 using the following parameters: (1) an interdependency threshold (percentage or count), and (2) a degree of separation between percentages or count in one direction between OS components 118 (E to G) and the reciprocal relationship (G to E). In some embodiments, these parameters are applied to remove, or filter, data of the OS components 118 from the relationship graph 224 to reduce the size of OS clusters. This might also vary depending on the kind of clustering algorithm used.

The interdependency threshold indicates a threshold percentage or count defining the relationship between two OS components 118 that, if exceeded, classifies the OS components 118 as interdependent but, if not exceeded, classifies the OS components 118 as independent. For example, the interdependency threshold may be set at 50%, and any OS components 118 having relationships with other OS components greater than 50% may be determined to be interdependent, while those that are less than the interdependency threshold percentage may be classified as independent.

The degree of separation parameter indicates an acceptable percentage or count between the relationships of two OS components 118 in different directions. Taking the example discussed above and shown in FIG. 4, the directional relationship from OS components E to G is 21% and the directional relationship from OS components G to E is 100%. The degree of separation parameter indicates that if one directional relationship is deemed to be interdependent, the reverse relationship must have a percentage that is less than the acceptable percentage of the separation parameter. For example, if the separation parameter is 40% and the relationship from OS components G to E is deemed to be interdependent—based on exceeding the previously discussed interdependency threshold (e.g., 50%)—then the relationship from OS components E to G is deemed to be independent (not interdependent) because the difference between the two percentages (100% and 21%) exceeds the 40% separation parameter. If it did not exceed the separation parameter (i.e., the G to E and E to G percentages were within the separation parameter of each other), the relationship from OS components E to G would be classified as interdependent, even if the percentage from D to A did not exceed the interdependency threshold.

Additionally or alternatively, after the above pruning (noise filtering) some embodiments also note any directional relationships that are 0% (i.e., did not appear with the other OS component 118) and automatically change the reciprocal directional relationship to 0% as well. Similarly, if one direction is non-zero, the other direction may be changed to non-zero (e.g., a minimum value) in some embodiments.

Considering another example, suppose the interdependency threshold is 50% and the separation parameter is 30%. And the example provided in FIG. 4 shows the relationship from OS component G to OS component F being 55%, which exceeds the interdependency threshold and therefore triggers the clustering module 218 to classify F to G as interdependent. Due to this classification, the cluster module 218 also inspects the reciprocal relationship of OS component F to G, which is 45%, which does not exceed the interdependency threshold of 50%. In sum, F to G is 55%, and G to F is 45%. Because the difference between these two inverse relationships is less than the separation parameter (30%), the clustering module 218 also classifies the relationship from OS components G to F as interdependent based on the separation parameter. In other words, when one directional relationship exceeds the interdependency threshold (F to G) but its inverse directional relationship (G to F) does not, the latter relationship (G to F) may still be classified as possibly interdependent based because it is within the separation parameter away from the directional relationship that does exceed the interdependency threshold.

The interdependency threshold and the separation parameter are more complicated in some embodiments than a fixed threshold and a degree of separation by subtraction, respectively. Some embodiments use a degree of separation that takes into account the value of each of the directional relationships of the OS components 118, rather than just the difference. For example, the following equation may be applied to compute the degree of separation between two OS components A and B:

$$\text{Degree of Separation} = \left| \frac{(A \text{ to } B) - (B \text{ to } A)}{(A \text{ to } B) + (B \text{ to } A)} \right|$$

Numerous other techniques may be used to calculate the degree of separation.

The relationship module 216 is configured to apply the interdependency threshold and the degree of separation parameter to filter the relationship graph 224 and prepare it for clustering. OS component 118 directional relationships that do not pass either parameter may be tagged, edited, deleted, or modified to show as much.

The clustering module 218 organizes the OS components 118 into clusters, such as the clusters 126 and 128, that may be assembled into hydration package 129 for download to the client computing device 100. In some embodiments, the clustering module 218 applies a clustering algorithm to identify which OS components 118 are interdependent and which are independent to create the OS clusters 126, 128. The clustering module 218 creates OS clusters by organizing the OS components 118 that are interdependent together. As shown, OS components A, B, and C are interdependent and therefore organized into cluster 126. OS components D and E are interdependent and organized into OS cluster 128.

In some embodiments, the clustering module 218 applies the Dulmage-Mendelsohn algorithm to the relationship graph 224 to determine whether OS components 118 are interdependent or independent. Alternative embodiments use different clustering algorithms, such as K-Means, Mean-Shift, Density-Based Spatial Clustering of Applications with Noise (DBSCAN), Expectation-Maximization (EM) Clustering using Gaussian Mixture Models (GMM), Agglomerative Hierarchical Clustering, or the like. By applying such clustering algorithms, the clustering module 218 is able to identify interdependent OS components 118 from the relationship graph 224 and then create OS clusters 126,128 of interdependent OS components 118.

Some embodiments require two-way interdependency—either directly or indirectly—before being included in the OS clusters 126,128, meaning that two OS components 118 are determined to be interdependent in both direction (e.g., A to B and B to A). If either direction is independent (e.g., does not exceed the interdependency threshold or the separation parameter), some embodiments do not package the OS components 118 together into a cluster. Thus, in some embodiments, OS clusters 126,128 (as classified by the clustering module 218) only contain components that have direct or indirect two-way interdependency.

Again, direct two-way interdependency refers to two OS components 118 being determined to be interdependent in both directions (e.g., OS components A to B and B to A), either directly or indirectly. An example of direct interdependency would include OS components A and B being interdependent with each other in both directions. For instance, OS component A is present with OS component B 100% of the time, OS component B is present with OS component A 100% of the time, and the interdependency threshold is 60% (which is exceeded in both directions).

In some embodiments, the clustering module 218 creates a hydration package 129 of one or more of the clusters 126 and 128. As depicted, the hydration package 129 includes OS clusters 126 and 128. In some embodiments, the clustering module 218 correlates OS clusters together based on the directional relationships of their constituent OS components 118. This correlation is done by comparing the direction relationships of the OS components 118, and if any OS component 118 in one OS cluster 126 has a directional relationship to another OS component 118 in another cluster 128, the two OS clusters 126 and 128 are packaged together in the same hydration package 129. In other words, some embodiments will combined OS clusters into a hydration package 129 based on one or more OS components 118 having a relationship that is greater than the packaging threshold.

Additionally or alternatively, an indirect packaging threshold may also be applied to package OS clusters 126 and 128 into the hydration package 129. In this vein, the directional relationships between the OS components 118 in correlated OS clusters 126,128 are checked to see if they exceed a higher threshold than the packaging threshold. For instance, the highest relationship between OS components 118 in OS cluster 126 and 128 may be 55%, exceeding a 50% packaging threshold and, consequently, correlating OS cluster 128 to OS cluster 126. Additionally, the directional relationships of the OS components 118 in OS cluster 128 to other OS components not in either OS cluster 126,128 may be checked to see whether they exceed a higher indirect packaging threshold (e.g., 75%). If, say, OS component E in OS cluster 128 has a 90% relationship with another OS component 118 in neither OS cluster 126,128, that additional OS component 118 and its associated cluster of additional OS components are included in the hydration package 129. In sum, the directional relationships of the OS components 118 in correlated OS cluster 126,128 are checked to see whether they have strong relationships (e.g., greater than the indirect packaging threshold) to indicate that other OS clusters should be included in the hydration package 129. If so, they are added to the hydration package 129 by the clustering module 218.

When the client computing devices 100 requests an OS component 118 that has been clustered with other interdependent OS components 118, the entire hydration packaged 129 of OS clusters 126,128 of interdependent OS components 118 is transmitted to the client computing device 100 for hydration thereon. For instance, the example in FIG. 2 shows the clustering module 218 creating the hydration package 129 with cluster 126 (having interdependent OS components A, B, and C) and cluster 128 (having interdependent OS components D and E). If the client computing device 100 requests OS component A, the entire hydration package 129 of clusters 126 and 128 in which OS component A belongs, including OS components A-E, are hydrated to the client computing device 100. Though the client computing device 100 only requested OS component A, it receives the other OS components B-E as well, saving the need to later download these other interdependent OS components 118.

Figure 5:
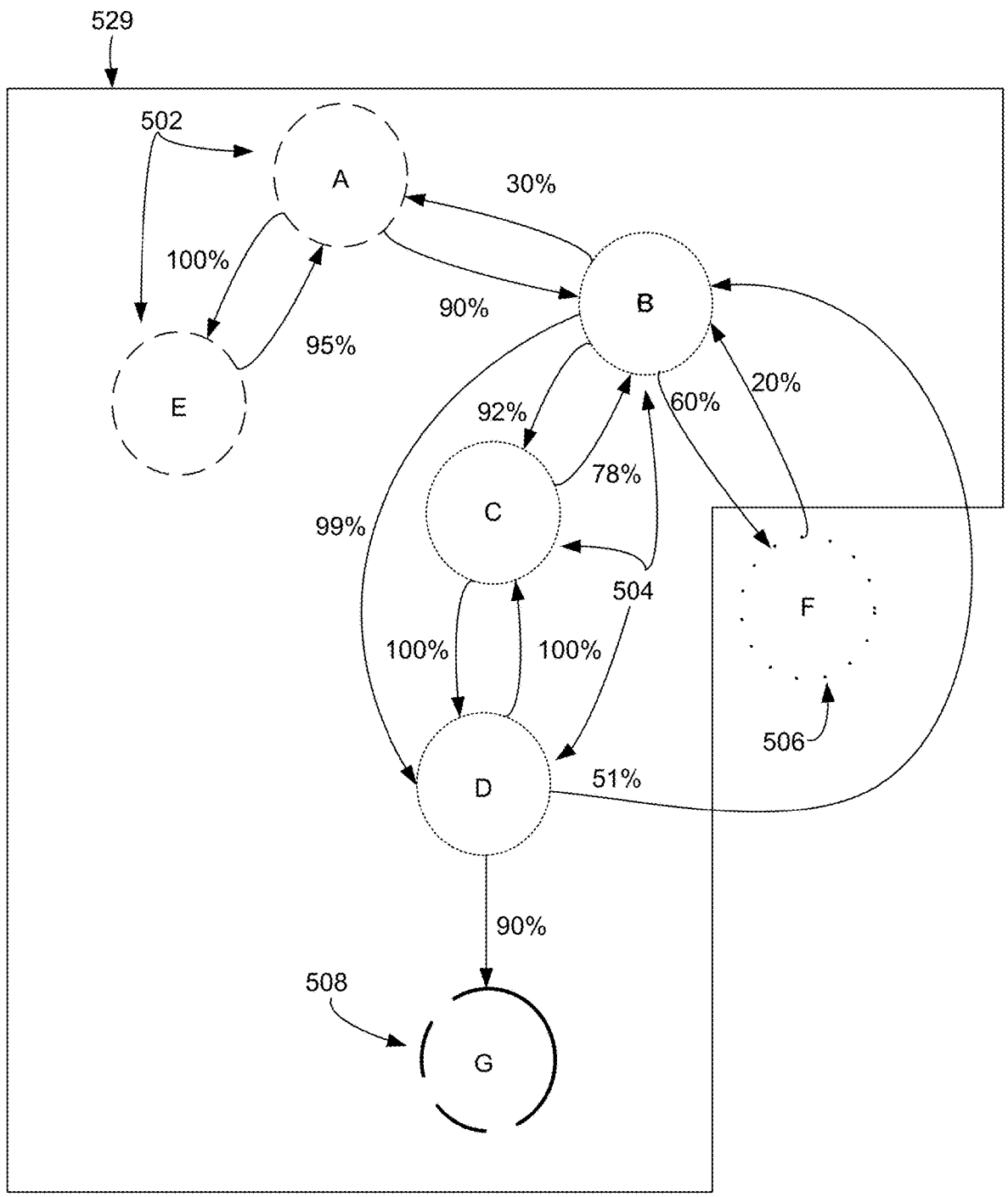
FIG. 5 illustrates a graphical diagram of created clusters of OS components.

FIG. 5 illustrates a component graph of OS components A-G that are grouped into four different clusters 502, 504, 506, and 508 based on their directional relationships to each other. Four total clusters 502-508 are shown with different OS components A-F. Specifically, OS components A and B are grouped into cluster 502; OS components B, C, and D are grouped into cluster 504; OS component F is grouped into OS cluster 506; and OS component G is grouped into cluster 508. Cluster 502 includes OS components A and E because they have two-way interdependency due to both being present in the telemetry data more than an interdependency threshold of 50%. Similarly, OS components B, C, and D are grouped into OS cluster 504 based on their bi-directional relationships exceeding the interdependency threshold of 50%. OS components F and G do not have two-way interdependency with other OS components, and therefore are grouped into their own OS clusters 506 and 508, respectively.

FIG. 5 also shows a hydration package 529 created to include OS clusters 502, 504, and 508 based on direct and indirect packaging thresholds. In the depicted example, the direct packaging threshold is established at 75%, meaning that any OS component A-G in one cluster 502-508 having a directional relationship greater than 75% with an OS component A-G in another cluster 502-508 creates a correlation between the two clusters 502-508 and includes both clusters 502-508 in the hydration package 529. Additionally, the indirect packaging threshold is established at 85%, meaning that any OS component A-G in the correlated (second) cluster 502-508 having a directional relationship greater than 85% with another OS component A-G in a third cluster 502-508 outside of the two correlated clusters creates another correlation between the third cluster 502-508 and the directly correlated two clusters 502-508. In other words, the direct and indirect packaging thresholds are used to incorporate disparate clusters 502-508 into the hydration package 529, either directly or indirectly (meaning through another cluster).

Applying the direct and indirect packaging thresholds, the hydration package 529 is created to include clusters 502, 504, and 508. Looking closer, cluster 502 includes a relationship from OS component A to B of 90%, which creates the correlation between clusters 502 and 504. Additionally, the relationship from OS component D to G is 90%, exceeding the indirect packaging threshold and thereby creating a correlation between clusters 502 and 508 through cluster 504. However, cluster 506 does not exceed either the direct or indirect packaging thresholds nor the interdependency thresholds, and therefore is not included in the hydration package 529.

The clustering module 218 analyzes the telemetry data 250 to create these correlations of the OS clusters 502, 504, and 508 and generate the hydration package 529. Then, when a client computing device 100 requests OS component A, for example, the entire hydration package 529 of OS clusters 502, 504, and 508 is hydrated to the client computing device 100. This allows the client computing device 100 to receive interdependent OS components E, B, C, D, and G at the same time as OS component A, saving valuable time and processing resources.

Looking again at FIG. 2, some embodiments include a simulator 220 to validate efficiency and train the relationship module 216 and the clustering module 218 to create more efficient relationship graphs 224 and clusters 126,128, respectively. The simulator 220 hydrates the learned clusters 126,128 to a test computer and monitors use of the OS components 118 against key indicators to understand the effectiveness of the OS component service 214 at creating clusters 126,128 with all of the OS components 118 that are actually needed by the applications 120. Moreover, the test computer may be an actual client computing device 100 or may be a simulated device in a cloud environment (e.g., on a server or virtual machine). The simulator 220 is optional and not used in all embodiments.

The key indicators for measuring the simulated clusters 126, 128 hydrated to the test computer include metrics indicating any of the following: (1) whether the hydrated OS components 118 were used while the application 120 was running; (2) the quantity of time the OS components 118 were used while the application 120 was running; and/or (3) how many times the application 120 did not have OS components 118 available to it on the local machines. The first two indicate whether the OS component service 214 is selecting OS components 118 that are actually being used, and the third indicates whether the OS components service 214 is missing requisite OS components 118.

Testing the clusters 126, 128 against these key indicators provides feedback data 220 that the clustering module 218 may use in selecting OS components 118 to include in particular clusters 126, 128. For example, the clustering module 218 may originally include OS components A, B, and C in cluster 126 that the simulator 220 runs on a test computer and measure against the above key indicators. During simulation, the simulator 220 may discover that an application 120 used only OS components A and B (not C) and also was missing OS component D, which was not included because it did not meet the interdependency threshold or the separation parameter mentioned above. This feedback data 220 may be supplied to the clustering module 218, which, in turn, modifies the cluster 126 by removing OS component C and adding OS component D thereto.

Simulating and measuring against these key indicators allow the clustering module 218 to determine whether to change the various thresholds and clustering algorithms mentioned herein in order to include more or fewer OS components 118 in the clusters, through changing the interdependency threshold or separation parameter discussed herein. Additionally or alternatively, such simulation may be used to relax or be stricter with the inter-cluster correlations used to generate the hydration packages 129, through changing the packaging thresholds used for inter-cluster grouping. In other words, the interdependency threshold, separation parameter, and packaging thresholds may be changed— either through machine-learning or by a developer—based on simulation of applications running on test devices.

Additionally or alternatively, this feedback data 220 may be used to modify the interdependency threshold and separation parameters without user intervention. For example, if the interdependency threshold is set at 50%, but requisite OS components 118 are missed, the feedback data 220 from the simulator 220 may signal the relationship module 216 to lower either parameter. Or, in the case of superfluous OS components 118 that were not used, the feedback data 220 from the simulator may signal the relationship module 216 to raise the above parameters. The relationship module 216 may then inspect the telemetry data to identify the interdependency threshold and/or separation parameter that would have yielded the actual OS components 118 that were needed by the applications 120 being tested.

In this manner, the simulator 220 provides another way to build robust clusters of OS components 118 for hydration to the client computing devices 100 using actual testing data. OS components 118 may be added and removed from clusters based on testing data, and the correct interdependency thresholds and/or separation parameters may be learned from the feedback data 220 of the tested computer. Finally, this simulation may be manual or automated, as long as it meets the goal of replicating the interactions of a user with an application 120.

So far, embodiments have been disclosed for learning the interdependencies of OS components 118 from other end devices 150A-N and then creating clusters for OS components 118 to hydrate to client computing devices 100. The same techniques may also or alternatively be used to identify which clusters of OS components 118 that are already stored on the client computing device 100 to load into active memory from secondary memory. For example, the client computing device may have OS component A, B, and C already stored in on its hard disk. When a particular application 120 requests use of OS component A, it may know that OS component B will also be required, and thus should also be moved to the active memory. To streamline things, in some embodiments, the interdependencies determined from the telemetry data 250 are shared with the client computing device 100. These interdependencies instruct the OS loader 124 to load a collection (e.g., more than one) of locally stored interdependent OS components 118 at the same time into the active memory when one is requested.

Figure 6:
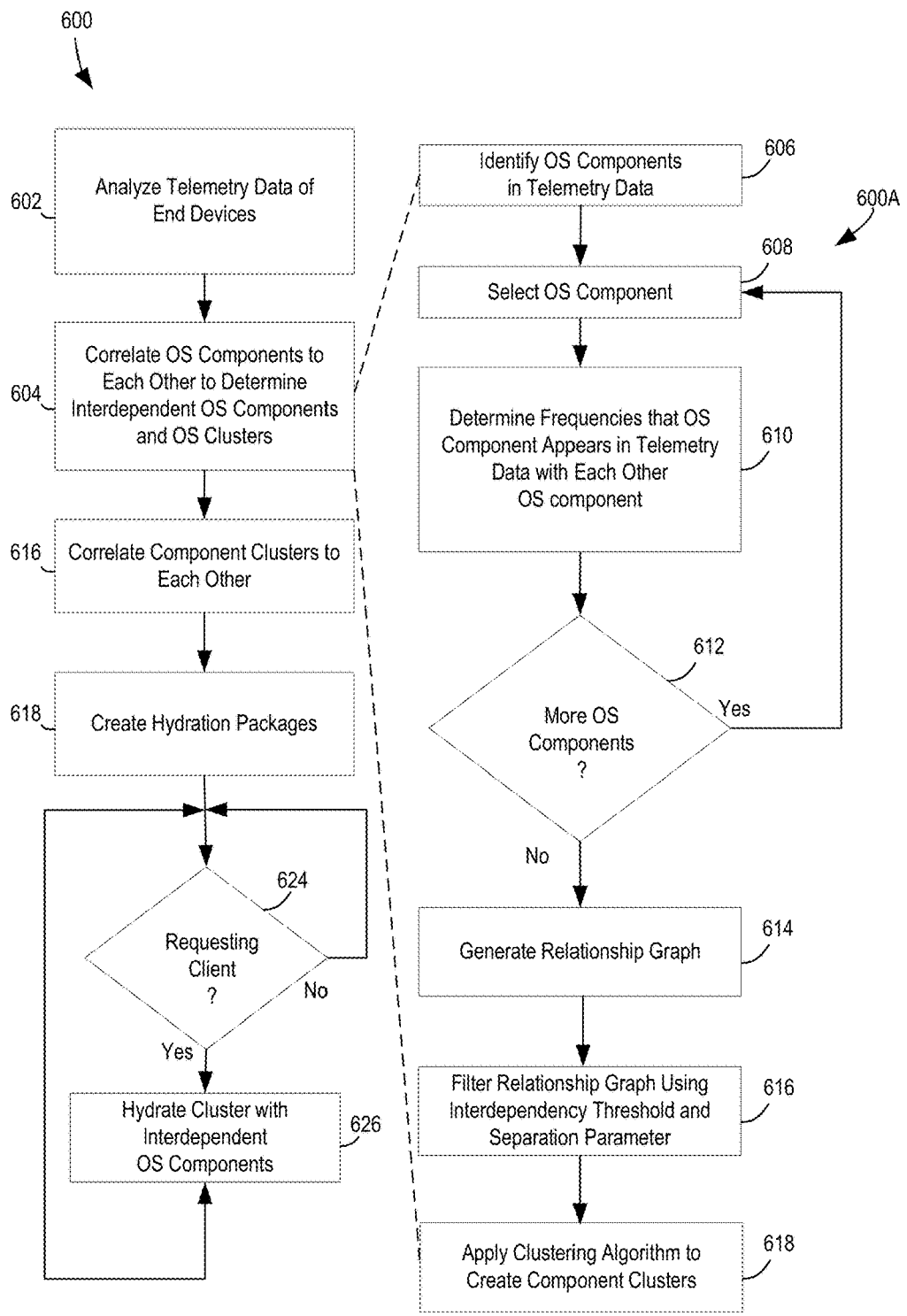
FIG. 6 illustrates a flowchart diagram of a workflow for autonomously building a component cluster of OS components for hydration to client computing devices.

FIG. 6 illustrates a flowchart diagram of a workflow 600 for autonomously building component clusters of OS components for hydration to client computing devices. As shown at 602, telemetry data from a plurality of end devices are analyzed. This telemetry data includes snapshots of different applications and OS components running on the end devices (e.g., the snapshots 302-308 in FIG. 3). All of the OS components identified in the snapshots of the telemetry data are correlated to each other to determine whether there are interdependencies, as shown at 604. An example workflow 600A may be executed to correlate the OS components to each other and identify the interdependencies therebetween.

Correlation workflow 600A involves the OS components first being identified in the telemetry data, as shown at 606. Each OS is then analyzed to learn which combinations of OS components are found frequently together when applications are running. To do so, an OS component is selected, as shown at 608. Filtering, or pruning, of the data is then applied using the directional relationship data of the telemetry data (e.g., the percentages of times OS components were found with each other), as shown at 610—e.g., OS component A was found 25% of the time with OS component B, 10% of the time with OS component C, 80% of the time with OS component D, and so on. Alternative embodiments count the number of times the OS component was found with each of the other OS components—e.g., OS component A was found 5 times with OS component B, 10 times with OS Component C, 12 times with OS component D, and so on. After these frequencies or count values are determined, embodiments run the same steps for the next OS component until frequencies/counts have been determined for all of the identified OS components, as shown by decision box 612.

A relationship graph similar to the one shown in FIG. 3 is generated, as shown at 614. The relationship graph shows the frequencies/counts between pairs of the OS components in the telemetry data. The relationship graph is filtered (e.g., directional relationship percentage or counts modified, changed, or deleted) by applying the aforementioned interdependency threshold, separation parameter, or both, as shown at 616. Once the data of the relationship graph is filtered, a clustering algorithm is applied to identify the OS components as interdependent or independent, and to organize the classified OS components into clusters based on their dependencies, as shown at 618.

Returning to workflow 700, the directional relationship data of the OS components in the create clusters are analyzed to correlate the clusters to each other, as shown at 616. This involves applying the aforementioned packaging thresholds to determine whether clusters may be correlated together. Hydration packages are created that include one or more correlated clusters, as shown at 618.

The OS component service waits for a requesting client computing device that requests an OS component within the clusters of its created hydration packages, as shown at 624. When such a request arrives (e.g., a request for OS component A), the hydration package of correlated clusters is hydrated to the client computing device, as shown at 626. Such hydration may involve downloading all of the OS components of the cluster.

Figure 7:
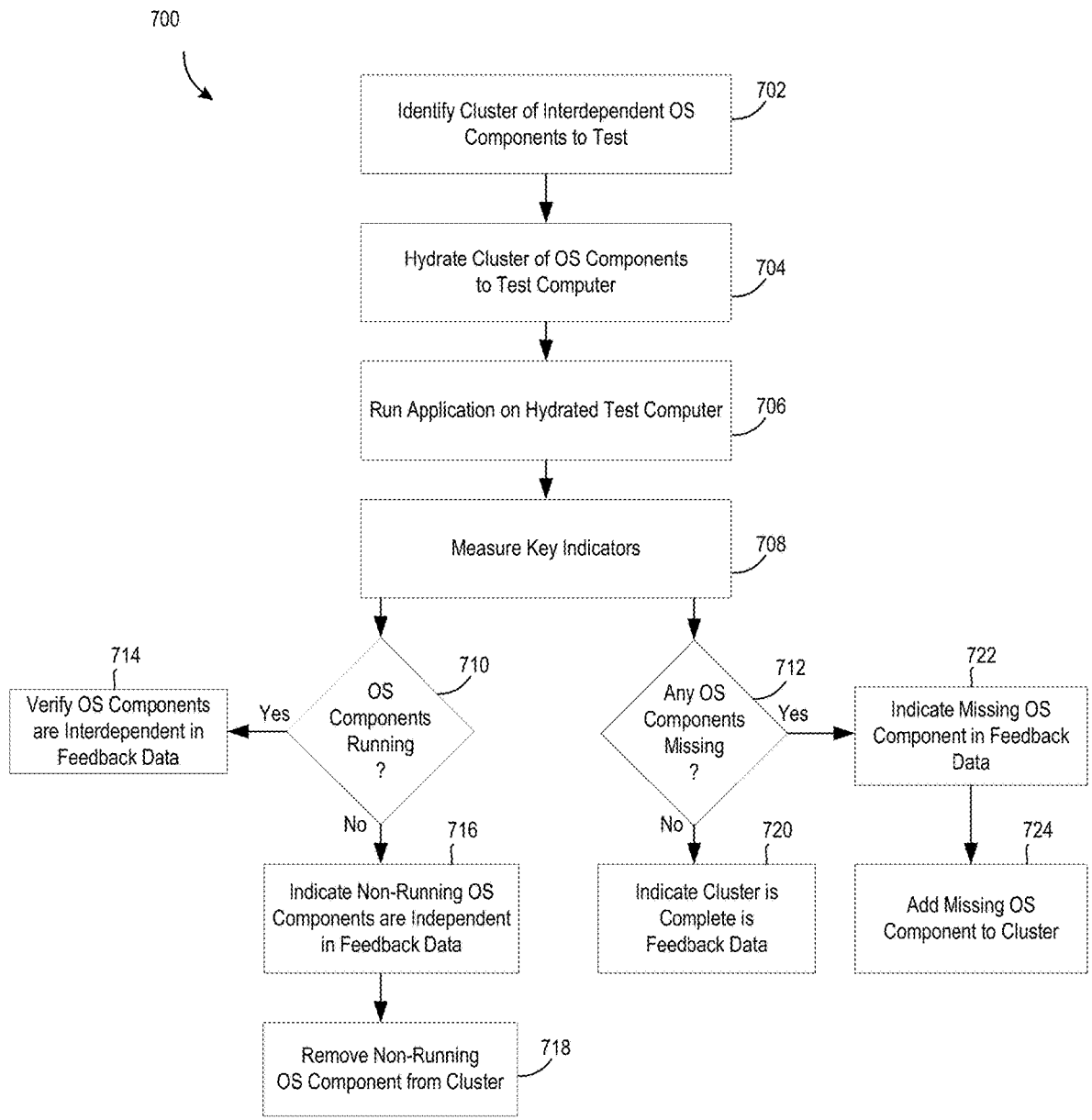
FIG. 7 illustrates a flowchart diagram of a workflow for testing and modifying machine-generated clusters of OS components.

FIG. 7 illustrates a flowchart diagram of a workflow 700 for testing and modifying machine-generated clusters of OS components. Workflow 700 is performed after clusters of OS components have been created by the previously discussed OS components service, executing, for example, the operations of workflow 600. As shown at 702, a cluster of interdependent OS components is identified. The cluster of OS components is hydrated to a test computer, as shown at 704. As previously discussed, the test computer may be a client computing device or a simulated computer in a cloud environment. Basically, the test computer may be any device or set of instructions for mimicking the way users interact with applications. Once the cluster of OS components is hydrated to the test computer, applications are run on the test computer, as shown at 706.

As shown at 708, key indicators are measured from the test computer with the hydrated cluster. These key indicators may indicate any of the following: (1) whether the hydrated OS components were used while an application was running; (2) the quantity of time the OS components were used while the application was running; and/or how many times the application needed dehydrated OS components. Along these lines, decision box 710 shows that the test computer is checked to see whether the OS components in the hydrated cluster are running Those that are verified to be interdependent with each other, as shown at 714. For example, if the cluster includes OS components A, B, and C and the test computer shows OS components A and B running, then the classification of components A and B as interdependent is maintained. The OS components in the cluster that are not running (e.g., OS component C in the above examples) indicated as independent in feedback data, as shown at 716, and may also be removed from the cluster, as shown at 718.

Another key indicator that is checked in whether the cluster is missing any OS components. This is shown by checking telemetry data of the test computer to see whether any dehydrated OS components (i.e., OS components not stored locally on the test computer) are needed by a running application. This is shown by decision box 712. If not, feedback data is created indicating the cluster is complete, as shown at 720. If so, however, the missing OS component is indicated in the feedback data, as shown at 722, and the missing OS component is added to the cluster, as shown at 724.

Additional Examples

Some additional examples are described in the following clauses:

1A. A method for building a component cluster of OS components for hydration to client computing devices, the method comprising:

analyzing telemetry data from a plurality of end devices to determine interdependencies of different OS components, the telemetry data comprising traces of the different OS components during previous runs of applications on the plurality of end devices;

correlating the different OS components to each other based on the telemetry data to determine at least two OS components are interdependent; and creating the component cluster to include one or more of the correlated OS components.

2A. The method of clause 1A, wherein said correlation of the different OS components to each other comprises applying a clustering algorithm to classify the at least two of the OS components.

3A. The method of clause 2A, wherein the clustering algorithm comprises at least one of Dulmage-Mendelsohn algorithm, K-Means, Mean-Shift, Density-Based Spatial Clustering of Applications with Noise (DBSCAN), Expectation-Maximization (EM) Clustering using Gaussian Mixture Models (GMM), or Agglomerative Hierarchical Clustering.

4A. The method of any of clauses 1A-3A, wherein said correlation of the different OS components to each other comprises first filtering at least some of the different OS components through:

creating a relationship graph of the different OS components;

calculating a difference between a first frequency from a first OS component to the second OS component minus a second frequency from a second OS component to the first OS component;

determining the difference is less than a separation parameter designating a maximum differential between two frequencies of the different OS components;

filtering some of the different OS components from the relationship graph based on said comparison of the determined frequencies against the interdependency threshold.

5A. The method of any of clauses 1A-4A, wherein said correlation of the different OS components to each other comprises first filtering at least some of the OS component through:

creating a relationship graph of the different OS components;

calculating a difference between a first frequency from a first OS component to the second OS component minus a second frequency from a second OS component to the first OS component;

determining the difference is less than a separation parameter designating a maximum differential between two frequencies of the different OS components;

filtering some of the different OS components from the relationship graph based on said comparison of the determined frequencies against the interdependency threshold.

6A. The method of any of clauses 1A-5A, further comprising:

creating a hydration package comprising the component cluster with the one or more of the correlated OS components.

7A. The method of clause 6A, further comprising:

receiving a request from a client computing device for an OS component in the component cluster; and transmitting the hydration package comprising the component cluster with the one or more of the correlated OS components to the client computing device for hydration thereon.

8A. The method of any of clauses 1A-7A, further comprising simulating the hydration package on a test end device by hydrating the hydration package to the test end device, executing an application thereon, and analyzing requisite OS components for the executing application.

9A. The method of any of clauses 1A-8A, further comprising:

hydrating the at least two of the OS components to a test computer;

determining that the at least two of the OS components were used by the test computer a number of times while the test computer ran one or more applications; and maintaining an interdependency classification of the at least two of the OS components based on the at least two of the OS components being used the number of times by the test computer.

10A. The method of any of clauses 1A-9A, further comprising:

hydrating the at least two of the OS components to a test computer;

determining a missing OS component is needed on the test computer after the at least two of the OS components have been hydrated; and adding the missing OS component to the component cluster based on the missing OS component being needed on the test computer.

11A. The method of any of clauses 1A-10A, further comprising adjusting an interdependency threshold used to correlate the different OS components to each other based on the missing OS component.

12A. The method of any of clauses 1A-12A, wherein the telemetry data comprises snapshots of the runs of applications on the end devices taken at a sampling rate.

13A. The method of any of clauses 1A-13A, wherein the client computing devices comprise at least one of a laptop, a mobile tablet, a smartphone, a gaming console, an Internet of Things (IoT) device, an augmented reality (AR) headset, or a virtual reality (VR) headset.

14A. A system for building a hydration package comprising one or more component clusters of operating system (OS) components, the hydration package for use in hydrating the OS components to client computing devices, the system comprising:
  memory embodied with instructions for building the one or more component clusters based on interdependencies of different OS components; and
  one or more processors programmed to:
    analyze telemetry data from a plurality of end devices to determine interdependencies of different OS components, the telemetry data comprising traces of the different OS components during previous runs of applications on the plurality of end devices,
    correlate the different OS components to each other based on the telemetry data to determine at least two OS components are interdependent;
    create the one or more component clusters to include one or more of the correlated OS components; and
    create the hydration package comprising the one or more component clusters.

15A. The system of clause 14A, wherein said correlation of the different OS components to each other comprises:
  analyzing directional relationships between the different OS components;
  identifying which of the directional relationships exceeds an interdependency threshold;
  identifying pairs of the different OS components with two-way interdependency based, at least in part, on the directional relationships exceeding the interdependency threshold; and
  classifying the pairs of the different OS components as interdependent based, at least in part, on identification of the pairs of the different OS components having two-way interdependency.

16A. The system of any of clauses 14A-15A, wherein creation of the one or more component clusters involves, at least in part:
  grouping the different OS components determined to be interdependent into a plurality of clusters;
  analyzing directional relationships of a first group of OS components of a first cluster to a second group of OS components of a second cluster;
  determining the directional relationship of at least one of the first group of OS components in the first cluster in the direction of at least one of the second group of OS components in the second cluster exceeds a packaging threshold; and
  incident to said determination, creating the hydration package to include the first cluster and the second cluster.

17A. The system of any of clauses 14A-16A, wherein the one or more processors are further programmed to:
  hydrate the one or more of the correlated OS components to a test computer;
  determine a hydrated OS component is unused on the test computer after the one or more of the correlated OS components have been hydrated; and
  remove the unused OS component from the hydration package.

18A. One or more computer-storage memory devices embodied with computer-executable instructions for building a component cluster of operating system (OS) components for hydration to client computing devices, the one or more computer-storage memory comprising:
  a relationship module configured to:
  analyze telemetry data from a plurality of end devices to determine
    interdependencies of different OS components, the telemetry data comprising traces of the different OS components during previous runs of applications on the plurality of end devices; and
  a clustering module to apply a clustering algorithm to the telemetry data to create the component cluster comprising one or more of the OS components.

19A. The one or more computer-storage memory devices of clause 18A, further comprising:
  a testing module configured to:
  hydrate the component cluster to a test computer;
  monitor an application running on the test computer that uses one of the one or more OS components;
  determine that a missing OS component is needed by the test computer during running of the application; and
  add the missing OS component to the component cluster.

20A. The one or more computer-storage memory devices of any of clauses 18A-19A, the one or more OS components are originally determined to be independent based, at least in part, on not exceeding the interdependency threshold but then determined to be interdependent based on exceeding a separation parameter.

The disclosed embodiments, examples, and techniques may be described in the general context of software, hardware elements, or program modules. Generally, such modules include routines, programs, objects, elements, components, data structures, and so forth that perform particular tasks or implement particular abstract data types. The terms "module," "functionality," and "component," as used herein, generally represent software, firmware, hardware, or a combination thereof. The techniques described herein are platform independent and, thus, may be implemented on a variety of commercial computing platforms and processing configurations.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 2 and described in more detail below, where tasks are performed by remote-processing devices that are linked through a communications network.

In one embodiment, the present disclosure is directed toward one or more computer systems or computing devices capable of carrying out the functionality of the embodiments described herein. In particular, some of the disclosed functionality is performed by a client computing device, and other functionality is performed by one or more cloud-based devices, or servers. An example of a client computing device is shown in FIG. 1, and example of a server is shown in FIG. 2. Though, the disclosed functionality of the client computing devices may be performed by the disclosed servers, and vice versa.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for building a component cluster of operating system (OS) components for hydration to client computing devices, the method comprising:
   automatically identifying at least one OS component currently on a first client computing device;
   analyzing telemetry data from a plurality of end devices to determine interdependencies of different OS components, the telemetry data comprising traces of the different OS components during previous runs of applications on the plurality of end devices;
   correlating the different OS components to each other based on the telemetry data to determine at least two OS components are interdependent; and
creating the component cluster to include one or more of the correlated OS components based, at least in part, on the at least one OS component that is currently on the first client computing device.

2. The computer-implemented method of claim 1, wherein said correlation of the different OS components to each other comprises applying a clustering algorithm to classify the at least two OS components.

3. The computer-implemented method of claim 2, wherein the clustering algorithm comprises at least one of Dulmage-Mendelsohn algorithm, K-Means, Mean-Shift, Density-Based Spatial Clustering of Applications with Noise (DBSCAN), Expectation-Maximization (EM) Clustering using Gaussian Mixture Models (GMM), or Agglomerative Hierarchical Clustering.

4. The computer-implemented method of claim 1, wherein said correlation of the different OS components to each other comprises first filtering at least some of the OS component through:
   creating a relationship graph of the OS components;
   calculating a difference between a first frequency from a first OS component to a second OS component minus a second frequency from the second OS component to the first OS component;
   determining the difference is less than a separation parameter designating a maximum differential between two frequencies of the OS components; and
   filtering some of the OS components from the relationship graph based on said difference.

5. The computer-implemented method of claim 1, wherein said correlation of the different OS components to each other comprises first filtering at least some of the OS component through:
   creating a relationship graph of the OS components;
   calculating a difference between a first frequency from a first OS component to a second OS component minus a second frequency from the second OS component to the first OS component;
   determining the difference is less than a separation parameter designating a maximum differential between two frequencies of the OS components; and
   filtering some of the OS components from the relationship graph based on said-difference.

6. The computer-implemented method of claim 1, further comprising:
   creating an hydration package comprising the component cluster with the one or more of the correlated OS components.

7. The computer-implemented method of claim 6, further comprising:
   receiving a request from a client computing device for an OS component in the component cluster; and
   transmitting the hydration package comprising the component cluster with the one or more of the correlated OS components to the client computing device for hydration thereon.

8. The computer-implemented method of claim 1, further comprising simulating a hydration package on a test end device by hydrating the hydration package to the test end device, executing an application thereon, and analyzing requisite OS components for the executing application.

9. The computer-implemented method of claim 1, further comprising:
   hydrating the at least two of the OS components to a test computer;
   determining that the at least two of the OS components were used by the test computer a number of times while the test computer ran one or more applications; and
   maintaining an interdependency classification of the at least two OS components based on the at least two of the OS components being used the number of times by the test computer.

10. The computer-implemented method of claim 1, further comprising:
   hydrating the at least two of the OS components to a test computer;
   determining a missing OS component is needed on the test computer after the at least two of the OS components have been hydrated; and adding the missing OS component to the component cluster based on the missing OS component being needed on the test computer.

11. The computer-implemented method of claim 1, further comprising adjusting an interdependency threshold used to correlate the different OS components to each other.

12. The computer-implemented method of claim 1, wherein the telemetry data comprises snapshots of the runs of applications on the end devices taken at a sampling rate.

13. The computer-implemented method of claim 1, wherein the client computing devices comprise at least one of a laptop, a mobile tablet, a smartphone, a gaming console, an Internet of Things (IoT) device, an augmented reality (AR) headset, or a virtual reality (VR) headset.

14. A system for building a component cluster of operating system (OS) components for hydration to client computing devices, the system comprising:
 memory embodied with instructions for building the component cluster based on interdependencies of different OS components; and
 one or more processors programmed to:
 identify at least one OS component currently on a first client computing device;
 automatically analyze telemetry data from a plurality of end devices to determine interdependencies of different OS components, the telemetry data comprising traces of the different OS components during previous runs of applications on the plurality of end devices,
 correlate the different OS components to each other based on the telemetry data to determine at least two OS components are interdependent;
 create the component cluster to include one or more of the correlated OS components based, at least in part, on the at least one OS component that is currently on the first client computing device; and
 create a hydration package comprising the component cluster.

15. The system of claim 14, wherein the correlated OS components are correlated to each other and classified as interdependent or independent through application of a clustering algorithm.

16. The system of claim 15, wherein the one or more processors are further programmed to:
 hydrate the one or more correlated OS components to a test computer;
 determine an hydrated OS component is unused on the test computer after the one or more OS components have been hydrated; and
 remove the unused OS component from the component cluster.

17. The system of claim 14, wherein the one or more processors are further programmed to:
 hydrate the at least two OS components to a test computer;
 determine a missing OS component is needed on the test computer after the one or more correlated OS components have been hydrated; and
 add the missing OS component to the component cluster based on the missing OS component being needed on the test computer.

18. One or more computer-storage memory devices embodied with computer-executable instructions for building a component cluster of operating system (OS) components for hydration to client computing devices, the one or more computer-storage memory comprising:
 a relationship module configured to:
 automatically analyze telemetry data from a plurality of end devices to:
 identify at least one OS component currently on a first client computing device,
 determine interdependencies of different OS components, the telemetry data comprising traces of the different OS components during previous runs of applications on the plurality of end devices, and
 correlate the different OS components to each other based on the telemetry data to determine at least two OS components are interdependent; and
 a clustering module to apply a clustering algorithm to the telemetry data to create the component cluster comprising one or more of the OS components based, at least in part, on at least one OS component that is currently on a first client computing device.

19. The one or more computer-storage memory devices of claim 18, further comprising:
 a testing module configured to:
 hydrate the component cluster to a test computer;
 monitor an application running on the test computer that uses one of the one or more OS components;
 determine that a missing OS component is needed by the test computer during running of the application; and
 add the missing OS component to the component cluster.

20. The one or more computer-storage memory devices of claim 18, the one or more OS components are originally determined to be independent based, at least in part, on not exceeding an interdependency threshold but then determined to be interdependent based on exceeding a separation parameter.

* * * * *